United States Patent
Pezeshkian

(10) Patent No.: US 8,396,136 B1
(45) Date of Patent: Mar. 12, 2013

(54) CLOSE-PROXIMITY COMMUNICATIONS SYSTEM USING CAPACITIVELY COUPLED SIGNAL TRANSFER

(75) Inventor: Narek Pezeshkian, Glendale, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 902 days.

(21) Appl. No.: 12/507,324

(22) Filed: Jul. 22, 2009

(51) Int. Cl.
*H04B 3/00* (2006.01)

(52) U.S. Cl. ......... 375/257; 375/258; 257/678; 257/679

(58) Field of Classification Search .................. 375/257, 375/258; 257/678, 679; 235/451, 379, 350, 235/351
See application file for complete search history.

(56) References Cited

U.S. PATENT DOCUMENTS

| | | | |
|---|---|---|---|
| 4,756,667 A * | 7/1988 | Wyrostek et al. | 416/155 |
| 4,763,340 A | 8/1988 | Yoneda et al. | |
| 5,387,911 A * | 2/1995 | Gleichert et al. | 341/95 |
| 5,583,525 A | 12/1996 | Nekomoto et al. | |
| 5,847,447 A * | 12/1998 | Rozin et al. | 257/678 |
| 6,870,271 B2 | 3/2005 | Sutherland et al. | |
| 6,970,867 B1 * | 11/2005 | Hsu et al. | 1/1 |

FOREIGN PATENT DOCUMENTS

WO  WO 98/01905  1/1998

OTHER PUBLICATIONS

Zimmerman, T.G.; Personal Area Networks: Near-Field Intrabody Communication; IBM Systems Journal; 1996, pp. 609-617, vol. 35, Nos. 3&4, USA.

* cited by examiner

*Primary Examiner* — Zewdu Kassa
(74) *Attorney, Agent, or Firm* — Ryan J. Friedl; Kyle Eppele

(57) ABSTRACT

A system includes a first device having a first transceiver and a first device electrode pair connected to the first transceiver, and a second device having a second transceiver and a second device electrode pair connected to the second transceiver. The second device electrode pair is located relative to the first device electrode pair such that the first device electrode pair and the second device electrode pair form a capacitive network. The first transceiver and second transceiver are each configured to receive a plurality of bits, encode each bit of the plurality of bits, and DC balance and transmit each of the plurality of encoded bits over the capacitive network. Methods for use with the system are provided for encoding and transmitting data, as well as receiving and decoding the encoded data.

18 Claims, 15 Drawing Sheets

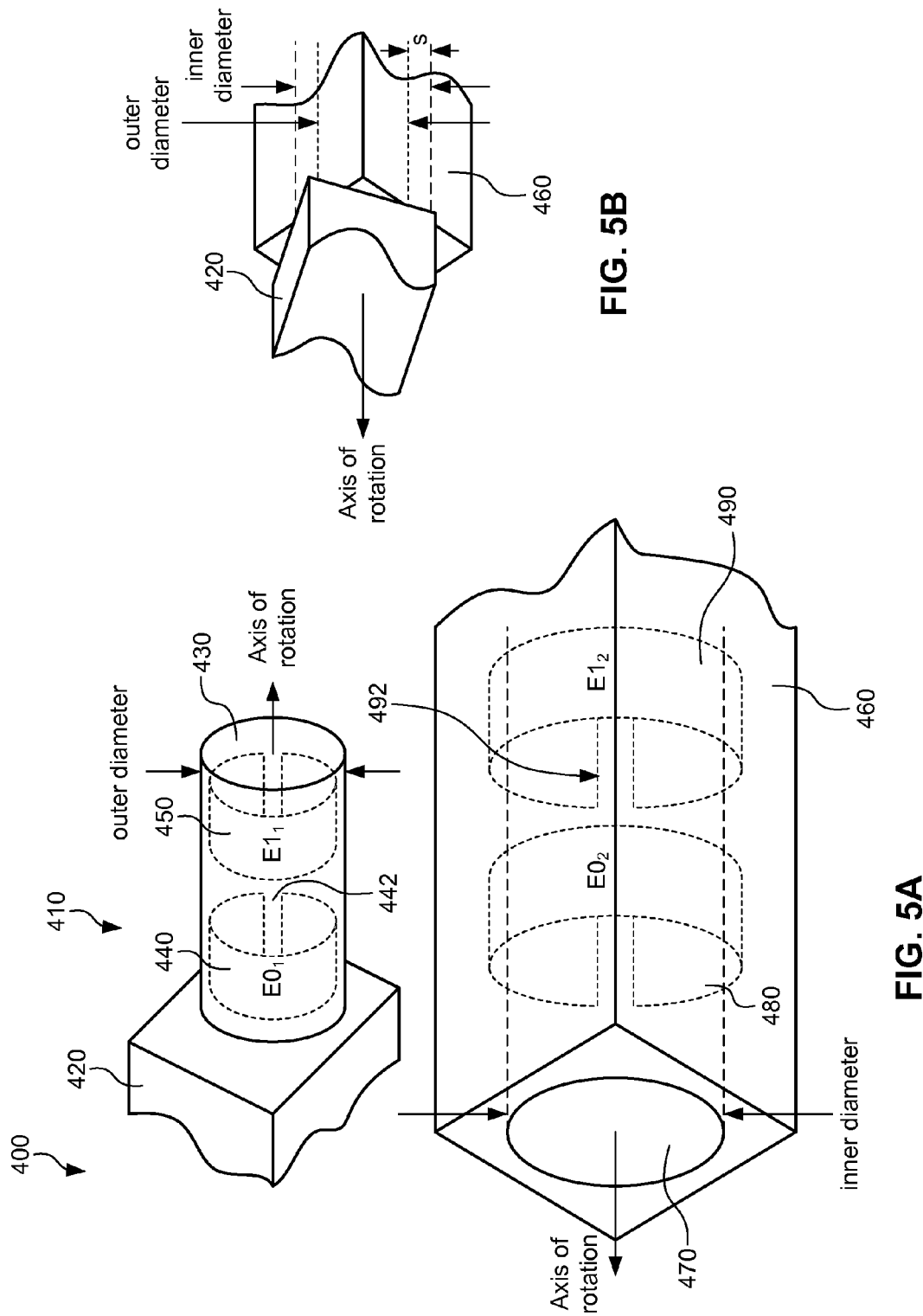

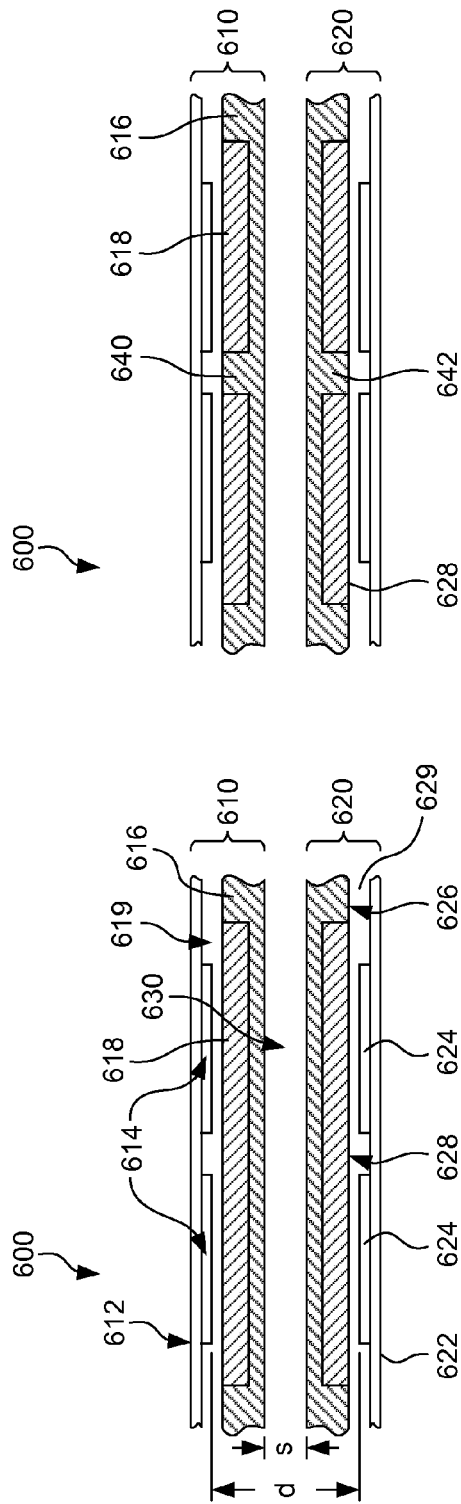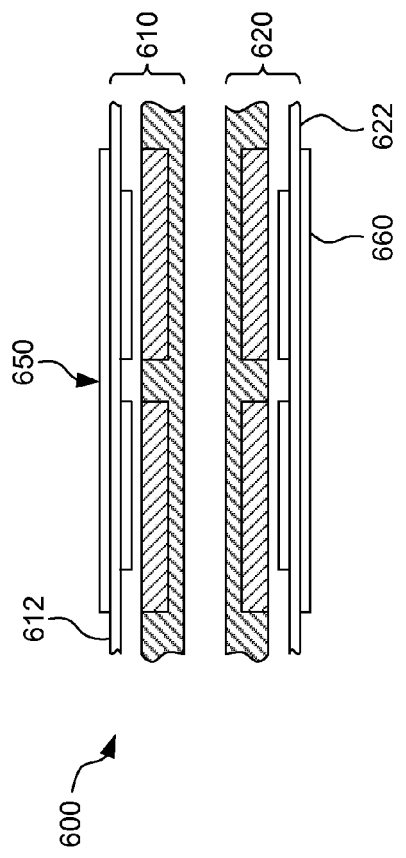

CLOSE-PROXIMITY COMMUNICATIONS SYSTEM USING CAPACITIVELY COUPLED SIGNAL TRANSFER

FEDERALLY SPONSORED RESEARCH AND DEVELOPMENT

The Close-Proximity Communications System Using Capacitively Coupled Signal Transfer is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil., reference Navy Case No. 99750

BACKGROUND

There are numerous ways that two electrically isolated devices can communicate. Radio frequency (RF) communications is one of the most common communication methods. However, for close proximity communication, RF communication is not desirable in light of the bandwidth requirements, power consumption, and design complexity associated with RF system design.

Infrared (IR) communication presents another possible communication method, wherein infrared light is used to communicate digital information. Compared to RF, IR is more suitable for proximity communications, but the transceiver aperture must be kept relatively free of blockage (e.g. dust and dirt build up). As a result, IR communication is not generally suitable for outdoor applications. To overcome such blockages, the output power of the IR transmitter can be increased which increases overall power consumption. Additionally, IR diodes and transistors, whether packaged together or separate, have some amount of height, which may not be ideal for certain communication devices.

Magnetic coupling offers another communication alternative. This form of communication uses magnetic fields to allow two devices that are magnetically coupled to communicate. The magnetic fields are typically generated by driving coils. The generated magnetic field is picked up by a pick-up coil on the receiving circuitry. For fast communications, the coils have to be small to reduce the coil charging time. However, this results in a weak magnetic field generated by the small coil, meaning that: a) effective communications may only be possible if the generator and pick-up coil are placed very near each other, beyond practical limits, b) the receiver circuitry of the pick up coil has be extremely sensitive, or c) there must be a set of separate generator and pick-up coil in each transceiver where the pick-up coil can be made bigger to be more effective, but this means that the coils take up additional space in each device. Bigger coils and/or more power is needed to generate larger magnetic fields to meet the above limitations, but this requires more device space and/or more power consumption.

A need exists for a system and method that allows for close-proximity communication between devices without requiring high power consumption or significant device space.

BRIEF DESCRIPTION OF THE DRAWINGS

FIGS. 3-7 show diagrams of various embodiments of system configurations in accordance with the Close-Proximity Communications System Using Capacitively Coupled Signal Transfer.

FIG. 8 shows diagrams of embodiments of a layer stack-up configuration of the system shown in FIG. 3.

DETAILED DESCRIPTION OF SOME EMBODIMENTS

Figure 1:
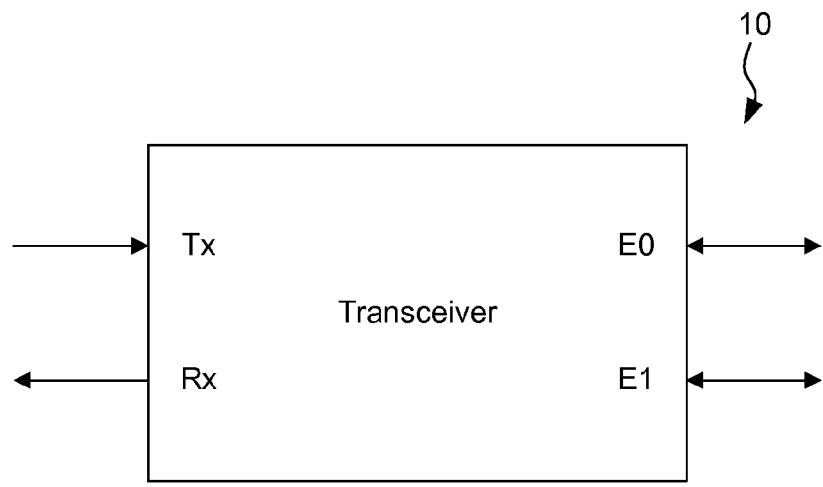
FIG. 1 shows a diagram of an embodiment of a transceiver for use with a system in accordance with the Close-Proximity Communications System Using Capacitively Coupled Signal Transfer.

As shown in FIG. 1, a transceiver 10, viewed as "black box", contains one input port (Tx), one output port (Rx), and two bi-directional differential ports (E0 and E1). As an example, data received by transceiver 10 may originate from a microprocessor. Ports E0 and E1 are connected to electrodes E0 and E1 and are bi-directional. Overlapping respective E0 and E1 electrodes of two transceiver devices forms a capacitive network (see FIG. 2), via which encoded bits are transmitted and received. Output bits from the data source, fed into the Tx port, are encoded and differentially transmitted over the E0 and E1 electrodes. Similarly, encoded bits differentially received by electrodes E0 and E1 are decoded and sent to the data source over the Rx port. This method allows two devices to communicate bi-directionally in half-duplex mode.

Transceiver 10 provides non-contact form of bi-directional digital communications between two electrically isolated devices. The devices communicate over a capacitively coupled differential interface by transmitting and receiving encoded binary data. Transceiver 10 allows DC balanced encoded bits to be differentially transmitted and received between two devices in close proximity. Such close proximity allows the formation of a capacitive interface via which data is communicated. In the following sections the capacitive interface, differential transmission, and bit encoding will be discussed.

Capacitive Interface

Figure 2:
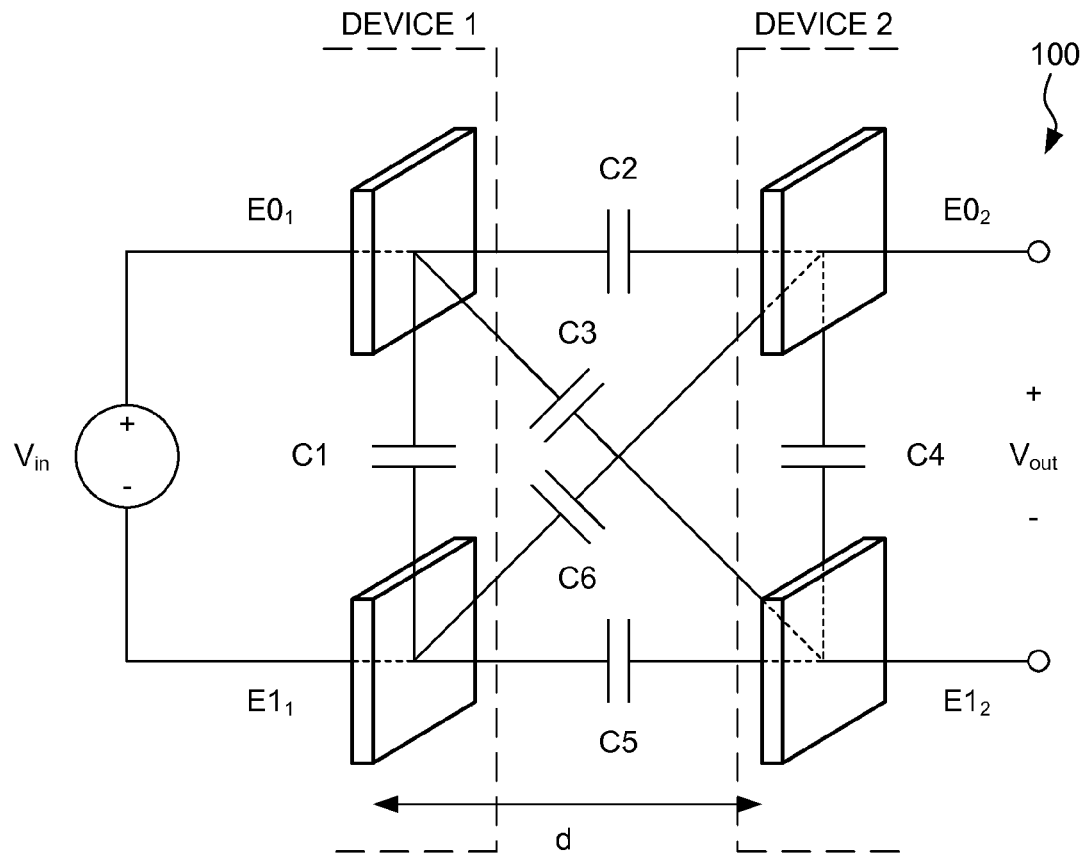
FIG. 2 shows a diagram of an embodiment of an equivalent capacitive network of the capacitive interface formed by a system in accordance with the Close-Proximity Communications System Using Capacitively Coupled Signal Transfer.
Figure 12:
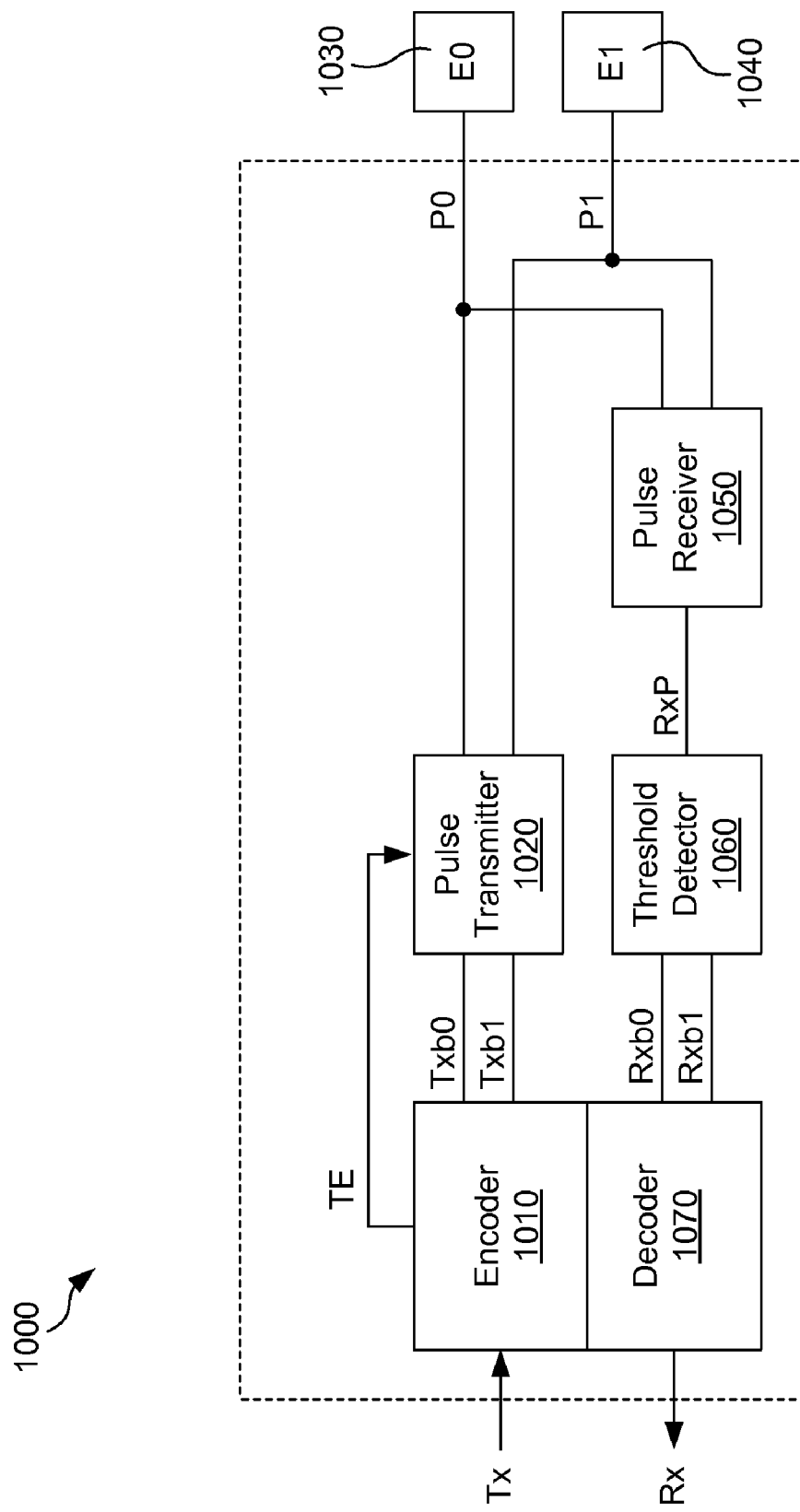
FIG. 12 shows a detailed block diagram of an embodiment of a transceiver for use with a system in accordance with the Close-Proximity Communications System Using Capacitively Coupled Signal Transfer.
Figure 13:
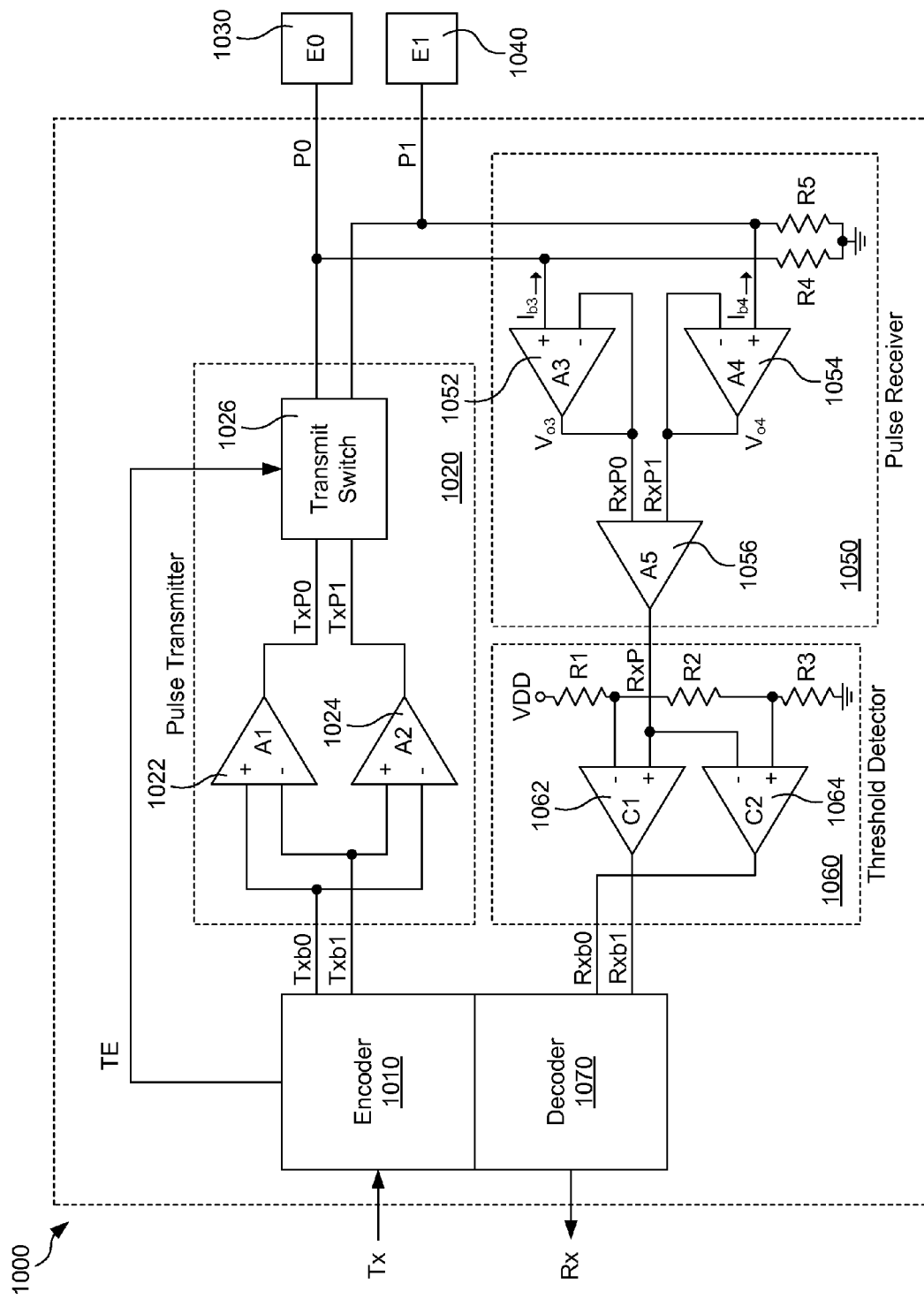
FIG. 13 shows a schematic diagram of an embodiment of a transceiver for use with a system in accordance with the Close-Proximity Communications System Using Capacitively Coupled Signal Transfer.

Each transceiver, such as transceiver 1000 of FIGS. 12 and 13, contains a set of electrodes that are connected to the E0 and E1 ports. The close proximity of the pair of electrodes in one device to another transceiver device forms a capacitive interface through which data is communicated. FIGS. 3-7 show perspective views of some examples of two such transceiver devices. FIG. 2 shows the equivalent capacitive network of the capacitive interface, regardless of the configurations shown in FIGS. 3-7. $V_{in}$ represents a differentially transmitted signal and $V_{out}$ a differentially received signal, in phase with $V_{in}$.

When placed close to each other, the electrodes form a capacitive network. As an example, for a capacitive network to form using 1 inch square electrodes, the distance between the electrodes of the devices should be approximately 10 mm. The closer the electrodes are, the better capacitive network formed. However, it is to be recognized that the close proximity distance between the electrodes that may cause a capacitive network to form may vary depending on various factors such as the size and shape of the electrodes and the dielectric material used. The subscript of each electrode denotes the device number. Exciting electrodes $E0_1$ and $E1_1$ with a voltage source $V_{in}$, causes a corresponding output voltage $V_{out}$, to appear across electrodes $E0_2$ and $E1_2$ through capacitive coupling. Similarly, exciting electrodes $E0_2$ and $E1_2$ with a voltage source $V_{in}$, causes a corresponding output voltage $V_{out}$, to appear across electrodes $E0_1$ and $E1_1$.

Due to the nature of the capacitive network, a fundamental voltage division takes place, causing $V_{out}$ to necessarily be an attenuated version of $V_{in}$. The analytical expression for $V_{out}$ is simplified to prove this point. In FIG. 2a, let all the electrodes be equal in dimension, then, due to symmetry, C4=C1, C5=C2, and C6=C3. Under this special condition, $$Vout = Vin \frac{C2 - C3}{2C1 + C2 + C3} \qquad \text{Eq. (1)}$$

which shows that $V_{out}$ is an attenuated version of $V_{in}$, therefore, signal amplification may be necessary by the receiver circuitry. Note that C2 is always greater than C3, causing $V_{out}$ to be in phase with $V_{in}$.

Figure 3:
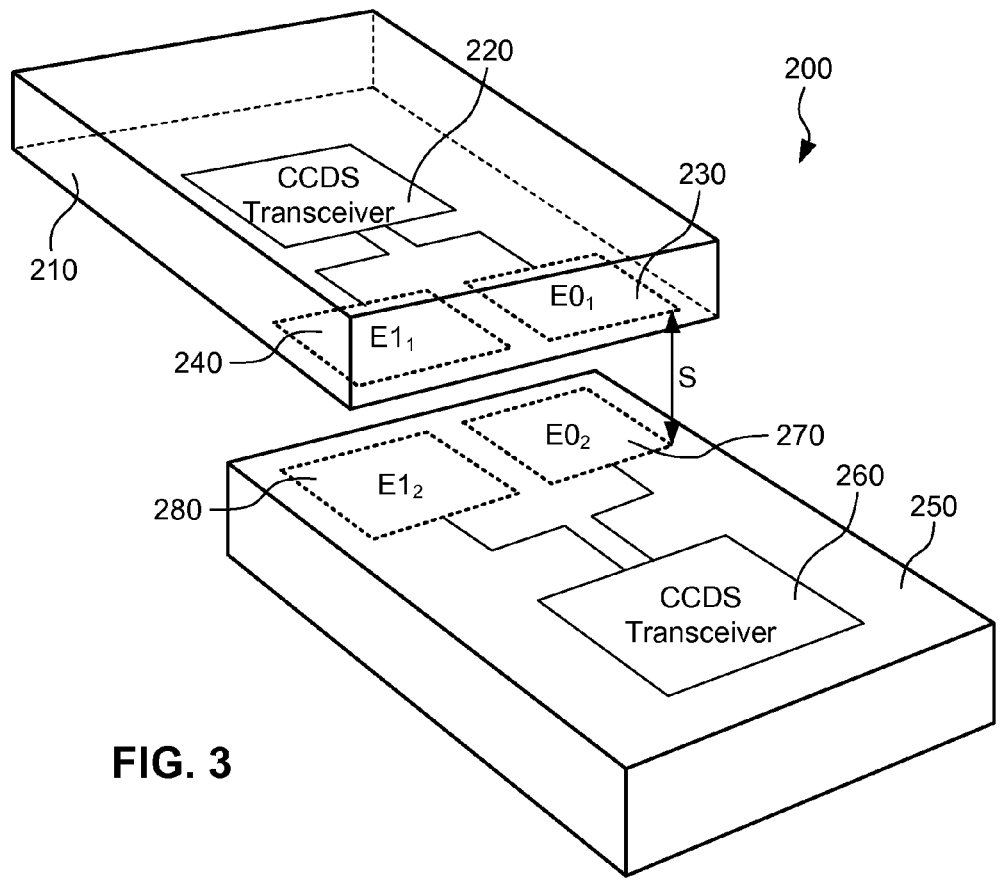

As shown in FIG. 3, system 200 includes device 210 and 250. Device 210 has a transceiver 220 and electrodes 230 and 240. Device 250 has a transceiver 260 and electrodes 270 and 280. When devices 210 and 250 are placed in close proximity to one another, separated by a distance s, electrodes 230 and 240 line up with electrodes 270 and 280, forming the capacitive interface.

Figure 4:
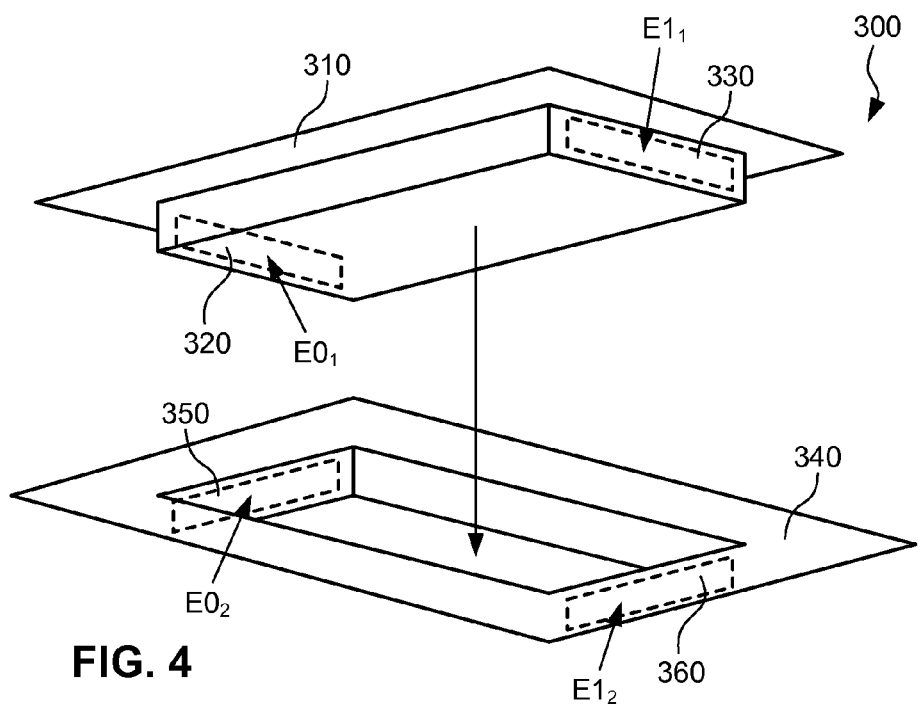

FIG. 4 shows another embodiment of a close proximity communication system 300 using capacitively coupled signal transfer. System 300 includes device 310 with electrodes 320 and 330, and device 340 with electrodes 350 and 360. The capacitive interface is formed when device 310 is inserted into device 340 such that electrode 320 lines up with electrode 350 and electrode 330 lines up with electrode 360.

As shown in FIG. 5A, system 400 includes device 410 and 460. Device 410 includes a base 420, shaft 430, and electrodes 440 and 450 formed on or within shaft 430. Electrodes 440 and 450 have breaks therein, such as break 442, to prevent a loop antenna from forming that prevents pickup of unwanted electromagnetic noise. Device 460 includes an internal opening 470 with electrodes 480 and 490 on or formed therein. Electrodes 480 and 490 have breaks therein, such as break 492, to prevent a loop antenna from forming. The capacitive interface is formed when shaft 430 of device 410 is inserted into opening 470 of device 460 such that electrode 440 lines up with electrode 480 and electrode 450 lines up with electrode 490 (see FIG. 5B). In this configuration, communications can take place even when the devices rotate with respect to each other.

Figure 7:
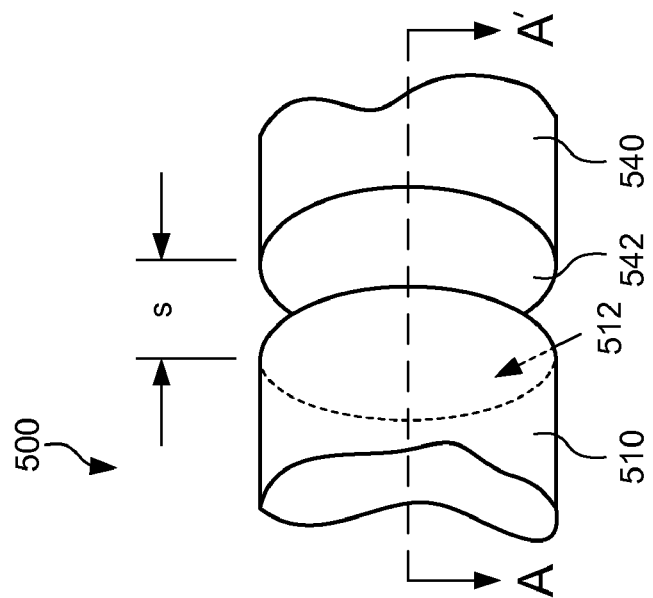
Figure 6:
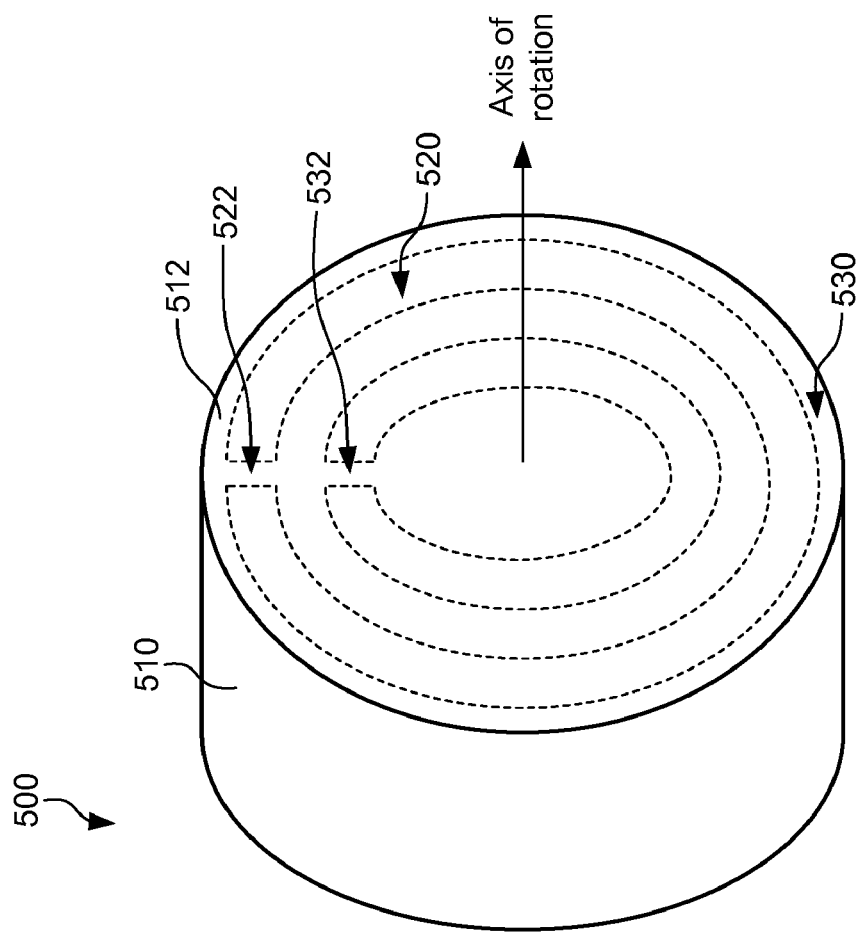

As shown in FIG. 6, system 500 includes a device 510 having an end 512 with a first electrode 520 and a second electrode 530. Electrode 520 has a break 522 therein and electrode 530 has a break 532 therein to prevent a loop antenna from forming. As shown in FIG. 7, when end 512 of device 510 is placed a distance s from a device 540 having an end 542, with device 540 being similarly configured as device 510, a capacitive interface is formed and the devices can communicate with one another even if one device rotates with respect to the other.

Each electrode in any of FIGS. 3-7 can be made from a simple copper or other conductive material. As an example, the electrodes can comprise copper areas formed on a printed circuit board (PCB). The electrodes may comprise various shapes depending on the functionality and configuration of the particular device it is contained within.

In some embodiments, each electrode pair can be placed inside the enclosure of a device. Layer stack-up examples for the electrode configuration shown in FIG. 3 are shown in FIG. 8. Referring to FIG. 8A, a system 600 may include a first device 610 and a second device 620 separated by a distance s by an air gap 630. It should be recognized that it is not necessary for air to be the content within the separation distance s, as any non-conductive dielectric material, liquid, or gas, can fill the gap. In fact, any non-conductive dielectric material, liquid, or gas with a high dielectric constant can help increase C2, therefore minimizing the voltage division. For example, the dielectric constant of air is about 1, so any improvement upon this value helps the system.

First device 610 may include a PCB 612, a pair of electrodes 614, and a non-conductive enclosure 616 having a dielectric material 618 therein. Non-conductive enclosure 616 may be separated from PCB 612 by an air gap 619. Second device 620 may be similarly configured as first device 610, including a PCB 622, a pair of electrodes 624, and a non-conductive enclosure 626 having a dielectric material 628 therein. Non-conductive enclosure 626 may be separated from PCB 622 by an air gap 629. Electrodes 614 and electrodes 624 may be separated by a distance d.

As shown in FIG. 8B, dielectric material 618 and 628 of device 610 and 620 may have a gap 640 and 642, respectively. Further, as shown in FIG. 8C, a floating shield 650 may be coupled to PCB 612 of device 610 and PCB 622 of device 620. Shields 650 and 660 may serve to protect any circuitry in close proximity to the electrodes from any potential interference when the electrodes are charged by the transmitter. The shield will cause some amount of attenuation to the received signal. That is, Vout will be further attenuated. However, the amount of attenuation may be tolerable based on the overall design. Shields 650 and 660 may be placed further away from PCB 612 to minimize the level of attenuation on Vout, but they cannot be too far away such that they will not act as a proper shield. The distance between the shield and the PCB depends on the amount of shielding that is needed and attenuation of Vout that can be tolerated. It should be noted that the relative dimensions shown in FIG. 8 are not to scale.

Further, in some embodiments, the air gaps and dielectric materials may or may not be present in the devices. Additionally, in some embodiments, the electrodes need not be of equal dimension, as one device can have larger electrodes than the other, although it is desirable to make both electrodes in a pair to be of equal dimension to maximize the common mode rejection (CMR) of any coupled noise. Electrode size variation simply changes the overall capacitance values in the capacitive network.

The voltage division of equation 1 reduces the signal-to-noise ratio (SNR) of the received signal and limits the maximum distance d, therefore, reducing the amount of voltage division is desired to maximize the SNR. From equation 1, the voltage division is reduced when C2 is increased and/or C1 and C3 are decreased. A first order expression for a parallel plate capacitor is given by, $$C = \varepsilon_0 \varepsilon_r \frac{A}{d} \quad \text{Eq. (2)}$$

where $\varepsilon_o$ is the permittivity constant, $\varepsilon_r$ is the relative permittivity of the dielectric material between the plates (e.g. for air the value of $\varepsilon_r$ is approximately 1, for ABS plastic $\varepsilon_r$ is approximately 3), d is the distance between the plates (or dielectric thickness), and A is the surface areas of the plates. C2 can then be increased by reducing d, but this may not be practical or possible based on the application. The surface area of the electrodes can be increased but this also causes an increase in C1 and C3 that is relatively significant. Additionally, increasing the electrode size may not be practical given the available real estate in a device.

Thus, the last option is to increase $\varepsilon_r$. This can be accomplished by placing a dielectric material between the electrodes, like that shown in FIGS. 8A-8C. It should be noted that the non-conductive enclosure material will also increase $\varepsilon_r$ since its value is greater than 1. But much higher valued dielectric materials, which may not be suitable as device enclosures, can be used within the enclosure for greater increase in capacitance, C2. In addition to increasing C2 (and C5) the dielectric material will also cause an increase in C1 (and C4) and C3 (and C6), but of much less significance.

The dielectric material placement can be further improved by concentrating its area of coverage to just over each electrode, as shown in FIG. 8B. Due to the removal of a small portion of the dielectric material, the value of C2 (and C5) will be slightly less than what it would be under the stack-up of FIG. 8A. On the other hand, the values of C1 (and C4) and C3 (and C6) will be much less than what they would be under the stack-up of FIG. 8A. The consequence of this is reduced voltage division (less signal attenuation) in the material stack-up of FIG. 8B compared to FIG. 8A. This is a desirable effect. Removing the non-conductive enclosure material from in between the two separated dielectric materials should further reduce the voltage division.

The shape of the dielectric material over the electrodes need not be the same as the electrodes. The effectiveness in reducing the voltage division is what is important, which depends on the dielectric constant and geometry of the overall material stack-up. The position and area of the dielectric material over the electrode area can be adjusted to minimize the voltage division across the capacitive network.

Figure 9:
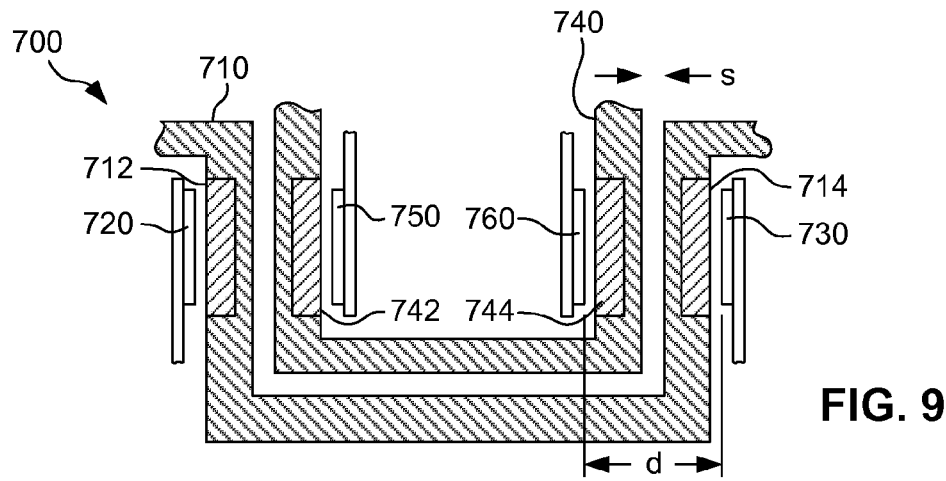
FIGS. 9-11 show cross-section views of embodiments of material layering configurations of systems such as those shown in FIGS. 4-7.
Figure 10:
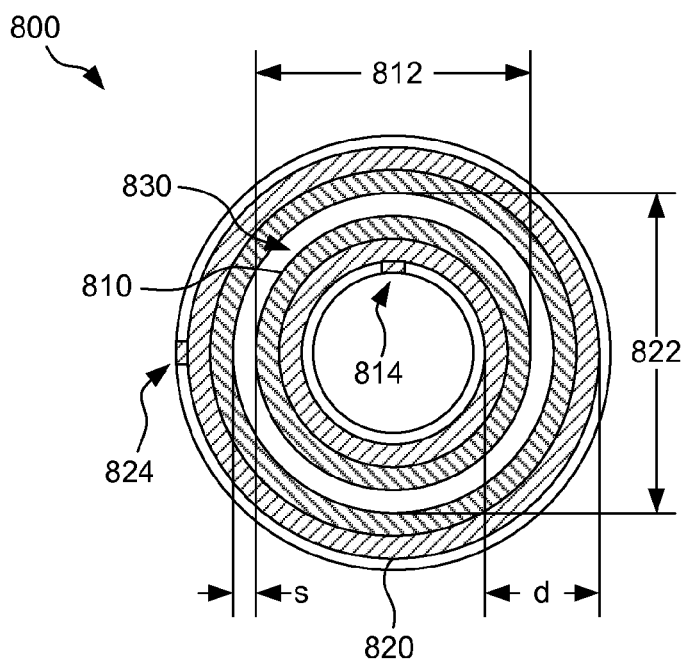
Figure 11:
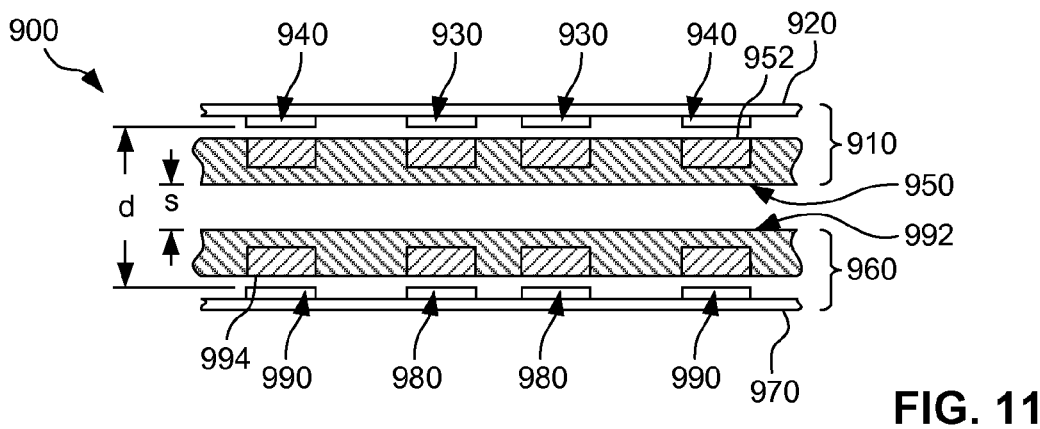

FIGS. 9-11 show cross-section views of embodiments of material layering configurations of systems such as those shown in FIGS. 4-7. FIG. 9 shows a cross-section view of a system similar to system 300 of FIG. 4. FIG. 9 depicts a system 700 having a first device 710 with a second device 740 inserted therein and separated by distance s. First device 710 contains dielectric materials 712 and 714, while second device 742 contains dielectric material 742 and 744. First device 710 also includes electrodes 720 and 730, while second device 740 includes electrodes 750 and 760. Dielectric materials 712, 714, 742, and 744 are aligned with corresponding electrodes 720, 750, 760, and 730, such that a capacitive interface is formed.

One advantage of the configuration shown in FIG. 9 is that the cross coupling capacitors C3 and C6, and the loading capacitor C4, is quite reduced since the electrode pair in each device are quite far from another. This reduces the voltage division. One disadvantage is that the farther the electrode pairs are within a device, the less effective they will be against common mode noise.

FIG. 10 shows a cross-section view of system similar to system 400 of FIG. 5A. FIG. 10 depicts a system 800 having a first device 810 inserted within a second device 820 and separated by an air gap 830 of a distance s. First device 810 has an outside diameter shown by dimension 812. First device 810 also includes an inner electrode having a break 814 therein. The purpose of break 814 is to prevent current flow due to external electromagnetic or magnetic field interference, which translates into noise. The break prevents a loop antenna from forming. Second device 820 has an inner diameter shown by dimension 822. Second device 820 contains an outer electrode having a break 824 therein. The electrodes of devices 810 and 820 are separated by a distance d, such that a capacitive interface is formed between the electrodes.

FIG. 11 shows a cross-section view along line A-A' of system 500 of FIG. 7. FIG. 11 shows a system 900 having a first device 910 and a second device 960. First device 910 includes a PCB 920, a first pair of electrodes 930, a second pair of electrodes 940, and a non-conductive enclosure 950 having dielectric material 952 therein. First device 910 and second device 960 may be separated by a distance s. Second device 960 includes a PCB 970, a first pair of electrodes 980, a second pair of electrodes 990, and a non-conductive enclosure 992 having dielectric material 994 therein. The electrodes of devices 910 and 960 are separated by a distance d, such that a capacitive interface is formed between the electrodes.

Differential Transmission

Two devices as discussed herein, such as devices 210 and 250, may communicate using differential signaling. Differential signals are used in a wide array of communications interfaces such as Ethernet, Low Voltage Differential Signaling (LVDS), Universal Serial Bus (USB), and many others. Differential signals are well understood and known to be highly immune to external noise and interference, such as electromagnetic interference (EMI) and radio frequency interference (RFI).

Differential signals are formed by two complimentary signals. The differential receiver recognizes the difference between these signals and ignores any common signals. This is known as common mode rejection (CMR). Since the wiring between two complimentary pairs is tightly coupled, any external form of noise and interference couples to both conductors that shows up at the receiver as common mode noise, which is rejected.

FIG. 12 shows a more detailed block diagram of the transceiver shown in FIG. 1. The following explanation of transceiver 1000 refers to FIGS. 2, 3, and 12, with the assumption that a first device is transmitting and a second device is receiving. A series of bits representing some binary information to be transmitted by transceiver 1000 is fed into the transmit line (Tx) of encoder 1010. For each bit in this series, encoder 1010 generates a corresponding pair of bits on lines transmit-bit-0 (Txb0) and transmit-bit-1 (Txb1). A pulse transmitter 1020 converts these bits into a differential pair of DC balanced pulses, pulse-0 (P0) and pulse-1 (P1), which represent the encoded bit. Encoder 1010 enables pulse transmitter 1020 via the transmit enable (TE) line. Pulse transmitter 1020 is deactivated upon completing the transmission.

The differential signal of $P0_1$ and $P1_1$ (subscript number denoting the device number) transmitted by the first device is capacitively coupled to the electrodes of the second device through the capacitance network formed by the electrodes, such as E0 1030 and E1 1040, of both devices. The differential signal of $P0_2$ and $P1_2$ received by the second device is an attenuated version of the signals $P0_1$ and $P1_1$. The attenuation is due to the inherent voltage division of the capacitive network. The amount of voltage division (or signal attenuation) is further worsened by any capacitive loading in parallel with C4. This additional capacitive loading can come from any parasitic capacitance and internal capacitance of pulse receiver 1050 and circuitry of pulse transmitter 1020.

The attenuated differential voltage of signals $P0_2$ and $P1_2$ is received by pulse receiver 1050. Pulse receiver 1050 amplifies this differential voltage, converts it into a single-ended signal, and adds a DC bias. The receive-pulse (RxP) signal provided by the pulse receiver 1050 is fed into a threshold detector 1060, which reconstructs the original pair of bits Txb0 and Txb1, as bits receive-bit-0 (Rxb0) and receive-bit-1 (Rxb1). The Rxb0 and Rxb1 bits are used by a decoder 1070 to reconstruct the original binary information, which is output on the receive line (Rx).

During transmission, a transceiver 1000 receives its own transmitted signal since the P0 and P1 lines are tied to both pulse transmitter 1020 output and the pulse receiver 1050 input. Therefore, transceiver 1000 will receive its own Txb0 and Txb1 bits at the input of decoder 1070 in the form of Rxb0 and Rxb1. Transceiver 1000 must either ignore these bits or not decode any received information while it is transmitting. This limitation causes transceiver 1000 to operate in half duplex mode, where information cannot be received while a transmission is in progress. However, this limitation can be avoided if multiple pairs of electrodes are used, with one pair of electrodes connected to pulse transmitter 1020 and the other pair of electrodes connected to pulse receiver 1050, such that pulse transmitter 1020 is isolated from pulse receiver 1050. Such configuration may be possible provided there is available space in the device within which transceiver 1000 is contained.

Transceiver 1000 can be constructed entirely as an integrated circuit (IC) with a Tx input port, Rx output port, E0/E1 bi-directional ports, positive supply connection, and negative supply connection (where connecting the negative supply pin to the system ground places transceiver 1000 in single-supply operation). Alternatively, an internal charge pump or a switching regulator can be used to provide a negative supply voltage from the external positive supply voltage, allowing the IC to have access to positive and negative supply voltages from a single external positive supply voltage. Other ports can be provided to allow custom setting of the threshold levels via external resistors. An IC version will dramatically reduce size, cost, and power consumption. Additionally, incorporating some form of hardware differential coding mechanism within the IC to make the received data polarity insensitive will further enhance the capabilities of transceiver 1000.

FIG. 13 depicts a simplified schematic diagram of transceiver 1000 as shown in FIG. 12. Pulse transmitter 1020 is broken down into two sections comprising amplifiers 1022 and 1024, and a transmit switch 1026. Amplifiers 1022 and 1024 are set up as two parallel difference-amplifiers, producing the two complimentary signals TxP0 and TxP1. The voltages of TxP0 and TxP1 can be represented as, $$TxP0 = A_{V1}(Txb0 - Txb1) \qquad \text{Eq. (3)}$$

$$TxP1 = A_{V2}(Txb1 - Txb0) \qquad \text{Eq. (4)}$$

where $A_{V1}$ and $A_{V2}$ are the voltage gains of the amplifiers 1022 and 1024, respectively. To generate symmetrical signals $A_{V1} = A_{V2} = A_V$. For simplicity, the feedback networks that produce these gains are omitted from the diagram.

Transmission is enabled by activating transmit switch 1026. Transmit switch 1026 is needed to isolate the output of amplifiers 1022 and 1024 during receive mode because the outputs of amplifiers 1022 and 1024 are low impedance. Failing to isolate the outputs will make signal reception impossible by severely loading the C4. Therefore, after completion of a transmission, transmit switch 1026 is disabled (i.e. switch is open, isolating the electrodes from the output of 1022 and 1024), causing its output to go into high-Z (or high impedance) mode. In high-Z mode the output of transmit switch 1026 must have a minimal capacitive and resistive loading effect on the electrodes E0 and E1 (or equivalently, C4). Transmit switch 1026 can be any one of a vast variety of solid state analog switches available from different manufacturers. Enabling transmit switch 1026 connects TxP0 to P0 and TxP1 to P1. The differential voltage across the electrodes is expressed as, $$P1 - P0 = TxP1 - TxP0 = 2A_V(Txb1 - Txb0) \qquad \text{Eq. (5)}$$

which is twice the magnitude of the individual gain of each difference-amplifier. Since the received signal is inherently attenuated, the greater the amplitude of the transmitted differential voltage the greater will be the received differential voltage. Transmitting twice the differential voltage between Txb1 and Txb0 equates to a 6 dB increase in the received SNR.

In some embodiments, amplifiers 1022 and 1024 can be replaced by a single, fully differential amplifier. In such case, with transmit switch 1026 closed, the output differential voltage will be, $$P1 - P0 = TxP1 - TxP0 = A_V(Txb1 - Txb0) \qquad \text{Eq. (6)}$$

Again, for simplicity, the feedback network that generates the gain $A_V$ is omitted. The fully differential amplifier produces one half the gain of the two parallel difference-amplifiers for a given amplifier gain of $A_V$. Even though its output voltage is 6 dB less than the difference-amplifiers, the required signals TxP0 and TxP1 can be generated with only one amplifier.

A pulse receiver 1050 comprising amplifiers 1052, 1054, and 1056, is shown in a standard three-amplifier instrumentation amplifier (IA) topology. Since it is important to minimize any loading across C4, pulse receiver 1050 must have low input capacitance and high input resistance. The low input capacitance helps to minimize the amount of voltage division across the capacitive network as indicated in equation 1. The high input resistance helps to increase the RC time constant formed between the capacitive network and the input resistance of the IA, which minimizes the exponential decay of the received signal. IA's are ideally suited for these requirements.

The high input impedance (low input capacitance and high input resistance) of the IA topology is much less of a constraint and concern when compared to the input bias current $I_b$ of the amplifiers 1052 and 1054. Electrodes E0 1030 and E1 1040 connected directly to the non-inverting input of amplifiers 1052 and 1054 cannot be allowed to float because the inherent input bias current of amplifiers 1052 and 1054 will charge the equivalent capacitive network to the supply rails, making signal reception impossible. Therefore, a DC current path to ground must be provided at the non-inverting input of amplifiers 1052 and 1054. This is shown as resistors R4 and R5 connected to ground.

The input resistance of amplifiers 1052 and 1054 is usually much higher than R4 and R5, therefore the need for R4 and R5 has the adverse effect of lowering the input resistance of pulse receiver 1050. R4 and R5 can be chosen to be of a sufficiently high value, however, $I_{b3}$ and $I_{b4}$ may cause too great an output offset voltage $V_{o3}$ and $V_{o4}$ (undesired DC voltage appearing at the A3 and A4 output). For example, if R4 and R5 are 1MΩ each with $I_{b3}$ and $I_{b4}$ both equal to 1 µA, then $V_{o3}$ and $V_{o4}$ will be equal to (1 µA)(1MΩ)=1V each. This leads to an undesired introduction of a common mode voltage at the inputs of A5 that works to minimize its CMR headroom, which can ultimately lead to decoding errors.

Amplifiers with higher $I_b$ tend to operate much faster than their lower $I_b$ counterparts. Higher bias currents require lower values for R4 and R5 to keep $V_o$ low. But low resistor values decrease the total RC time constant of the capacitive network and resistors R4 and R5. This in turn leads to an increase in the received signal decay rate. Therefore, the transmitted signal pulse widths must be shortened to minimize the amount of signal decay, so that proper decoding can take place. This means that the amplifiers must be fast to deal with short pulse widths, which happens to be the case when $I_b$ is large, as stated earlier. The goal, then, is to minimize $V_o$ while being able to successfully decode the received signal.

Figure 14:
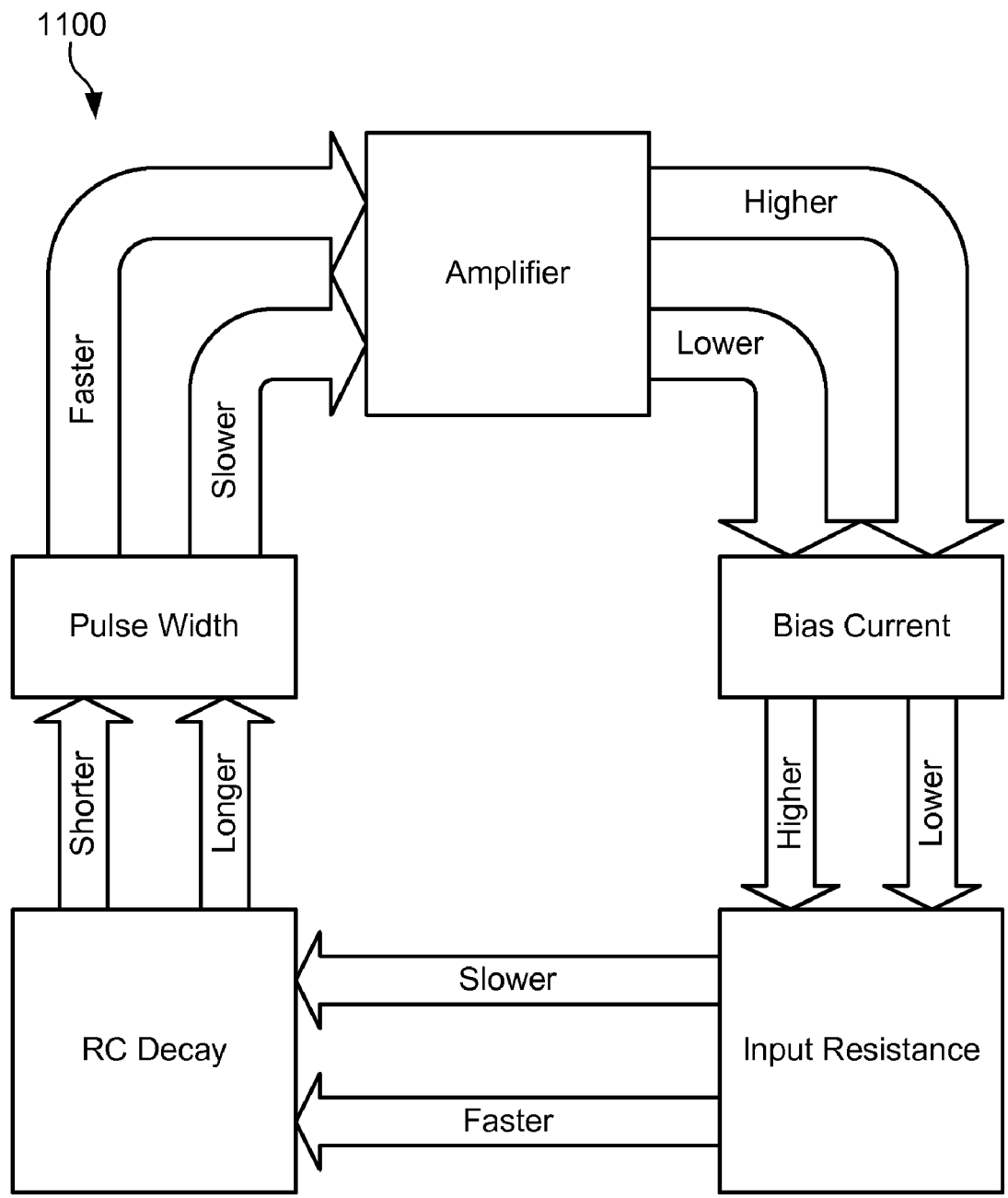
FIG. 14 shows a diagram illustrating the design loop of the pulse receiver input of a transceiver for use with a system in accordance with the Close-Proximity Communications System Using Capacitively Coupled Signal Transfer.

The inverse of this process also allows the above mentioned goal to be met. That is, when slower amplifiers are used, the signal pulse widths must be widened to allow ample time for signal propagation. Longer pulse widths, though, require slower signal decay for proper signal decoding. This in turn requires a higher total RC time constant, which requires high values for R4 and R5. Fortunately, slower amplifiers usually have low $I_b$ which when combined with higher R4 and R5 values still manage to produce a small $V_o$. This design loop of the input of pulse receiver 1050 is illustrated by diagram 1100 as shown in FIG. 14. Amplifier 1056 in the IA topology serves to provide CMR and add a DC bias to the output signal RxP. It should be noted that pulse transmitter 1020 and pulse receiver 1050 can operate with single-supply or dual-supply voltages. The single-supply operation, however, limits the magnitude of the transmitted signal, which can reduce the effective distance d.

Threshold detector 1060, including comparators 1062 and 1064, reconstructs the initial transmitted pair of bits Txb0 and Txb1 by comparing the signal RxP to two threshold levels. The DC bias sets RxP at the midpoint of the supply voltage VDD. The two threshold levels are set to deviate from this DC bias by an equal amount. The upper threshold level $V_{TH}$ is set somewhere above VDD/2, while the lower threshold level $V_{TL}$ is set somewhere below VDD/2. If a pulse riding around the DC offset value of RxP rises above $V_{TH}$ then threshold detector 1060 outputs a high bit on line Rxb1, and if the pulse drops below $V_{TL}$ then threshold detector 1060 outputs a high bit on line Rxb0. Setting the $V_{TH}$ and $V_{TL}$ values close to the DC offset value of RxP increases the sensitivity of threshold detector 1060, which means the pulses around the DC offset do not need to be amplified by a great deal. The disadvantage is that increasing the sensitivity leads to an increasing vulnerability to noise and errors.

Figure 15:
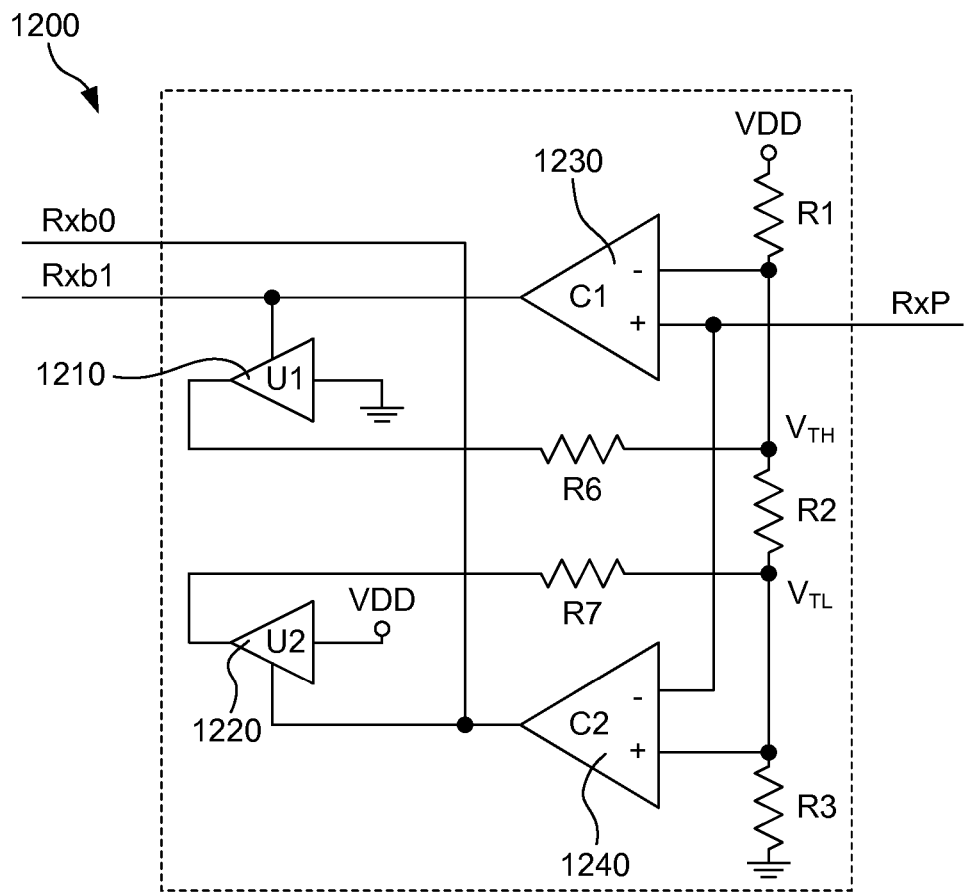
FIG. 15 shows a diagram of a threshold detector with hysteresis for use with a transceiver in accordance with the Close-Proximity Communications System Using Capacitively Coupled Signal Transfer.

FIG. 15 shows an embodiment of a threshold detector 1200 including hysteresis. Threshold detector 1200 may be used to further improve the detection of proper pulses in the presence of noise. Adding hysteresis to the threshold detector allows proper Rxb0 and Rxb1 reconstruction even in the presence of noise that the differential signaling and sensitivity settings were unable to eliminate and ignore.

The added buffers 1210 and 1220, connected to amplifiers 1230 and 1240, along with the additional resistors R6 and R7, allow individual adjustments for the amount of hysteresis. In some embodiments, buffers 1210 and 1220 can be replaced with inverters, N-channel MOSFETS, P-channel MOSFETs or diodes. In operation, when RxP rises above the upper threshold $V_{TH}$, a switch is activated (in this case buffer 1210) to pull R6 low, causing the value of $V_{TH}$ to drop according to the R1, R2, R3, and R6 resistors. When RxP transitions below the new value of $V_{TH}$ but above $V_{TL}$, the threshold levels returns back to normal values which only depend on R1, R2, and R3. In this region, buffers 1210 and 1220 are off. As RxP transitions below $V_{TL}$, a switch is activated (in this case buffer 1220) to pull up R7, causing the value of $V_{TL}$ to rise according to R1, R2, R3, and R7 resistors. Finally, as RxP transitions above the new value of $V_{TL}$ but below $V_{TH}$, the threshold levels return back to nominal values.

Figure 16:
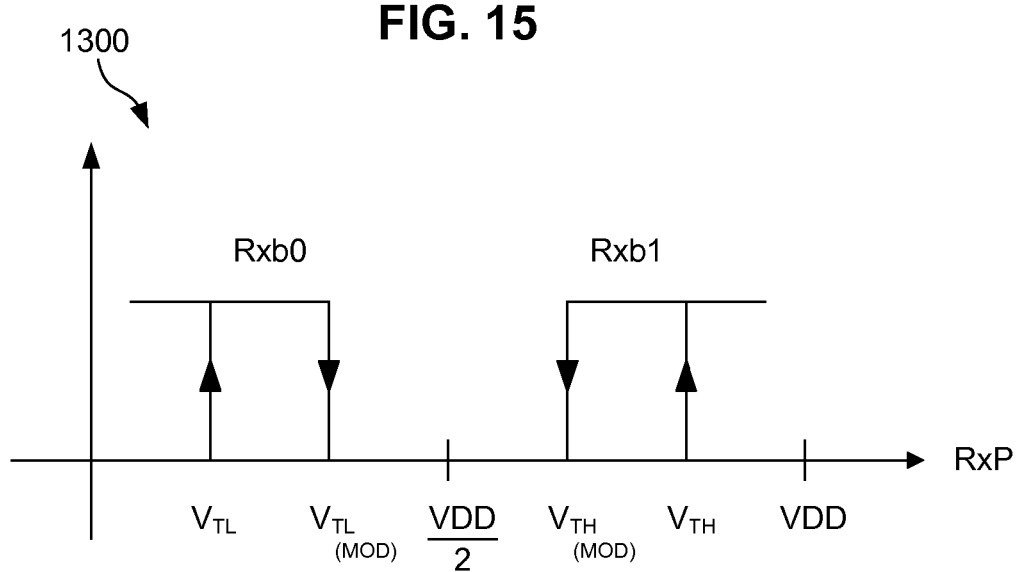
FIG. 16 shows a graph illustrating hysteresis plots for a threshold detector for use with a transceiver in accordance with the Close-Proximity Communications System Using Capacitively Coupled Signal Transfer.

FIG. 16 shows a graph 1300 illustrating hysterisis plots for a threshold detector such as that of FIG. 15. As shown, as RxP increases above VDD/2 passing the nominal upper threshold $V_{TH}$, Rxb1 switches high. At this time, the upper threshold voltage is modified to be lower than the nominal. As RxP transitions back, it passes the modified upper threshold $V_{TH\ (MOD)}$ before Rxb1 switches low. A similar transition is shown for Rxb0 when RxP varies below VDD/2. The DC value of RxP does not have to be VDD/2, but setting it as such maximizes the signal headroom above and below this value.

Figure 17:
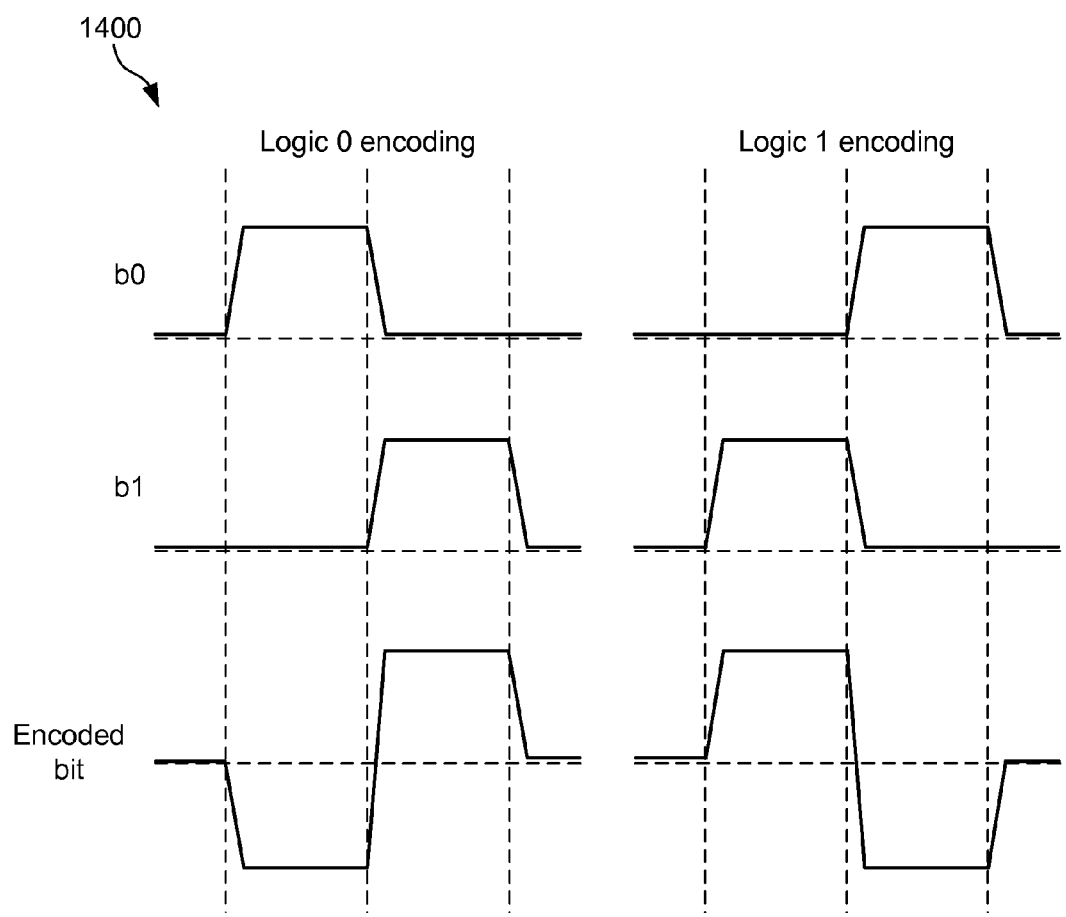
FIG. 17 shows encoding logic of data in accordance with the Close-Proximity Communications System Using Capacitively Coupled Signal Transfer.

A transceiver, such as transceiver 1000, may thus employ three techniques to deal with noise and make the entire communication system extremely noise-and-interference robust: 1) differential signaling to reject common mode noise; 2) sensitivity setting to ignore other coupled noise or non-rejected noise; and 3) hysteresis setting to detect correctly in the presence of noise Bit Encoding To implement a robust communications scheme, a method of line encoding having the following characteristics may be used: 1) every bit is encoded; 2) every encoded bit is DC balanced, and 3) every DC balanced encoded bit is differentially transmitted and received. The bit encoding technique may be used to effectively reduce the receiver error to zero. To achieve this, each bit in the binary sequence of the data may be encoded in a manner such that every encoded bit has the same average DC value. DC balancing of every bit ensures that the DC value of the overall encoded signal is unchanged and independent of the data. This means that there will be no long term signal decay and degradation that can cause decoding errors. Such encoded bits create a predictable encoded signal that the receiver can decode accurately. FIG. 17 illustrates a graphical illustration 1400 of the encoding logic for "zero" and "one" bit data. In some embodiments, the encoding logic for "zero" and "one" bit data may be the reverse of what is shown in FIG. 17.

The b0 and b1 logic levels correspond to the Txb0/Rxb0 and Txb1/Rxb1 lines shown in FIG. 13. With reference to FIG. 13, when encoder 1010 receives a zero bit on its Tx line it generates the corresponding Txb0 and Txb1 levels according to the logic 0 encoding column. In other words, decoder 1070 first generates a high pulse on line Txb0, then simultaneously drives Txb0 low while driving Txb1 high, and finally drives Txb1 low. The opposite sequence is performed for a one bit received on the Tx line. The encoded bit may be represented by, $$\text{Encoded bit} = b1-b0 \quad \text{Eq. (7)}$$

Amplifiers 1022 and 1024 generate two encoded bits of opposite polarity, the difference of which appears across the electrodes E0 1030 and E1 1040. Pulse receiver 1050 may receive an attenuated version of this encoded train of bits, which it can amplify if necessary. Pulse receiver 1050 may add a DC bias to the received signal, which is used for proper decoding. The same data sequence shown in FIG. 17 is now put through this encoding and decoding mechanism. The example signals are shown in FIG. 18.

Figure 18:
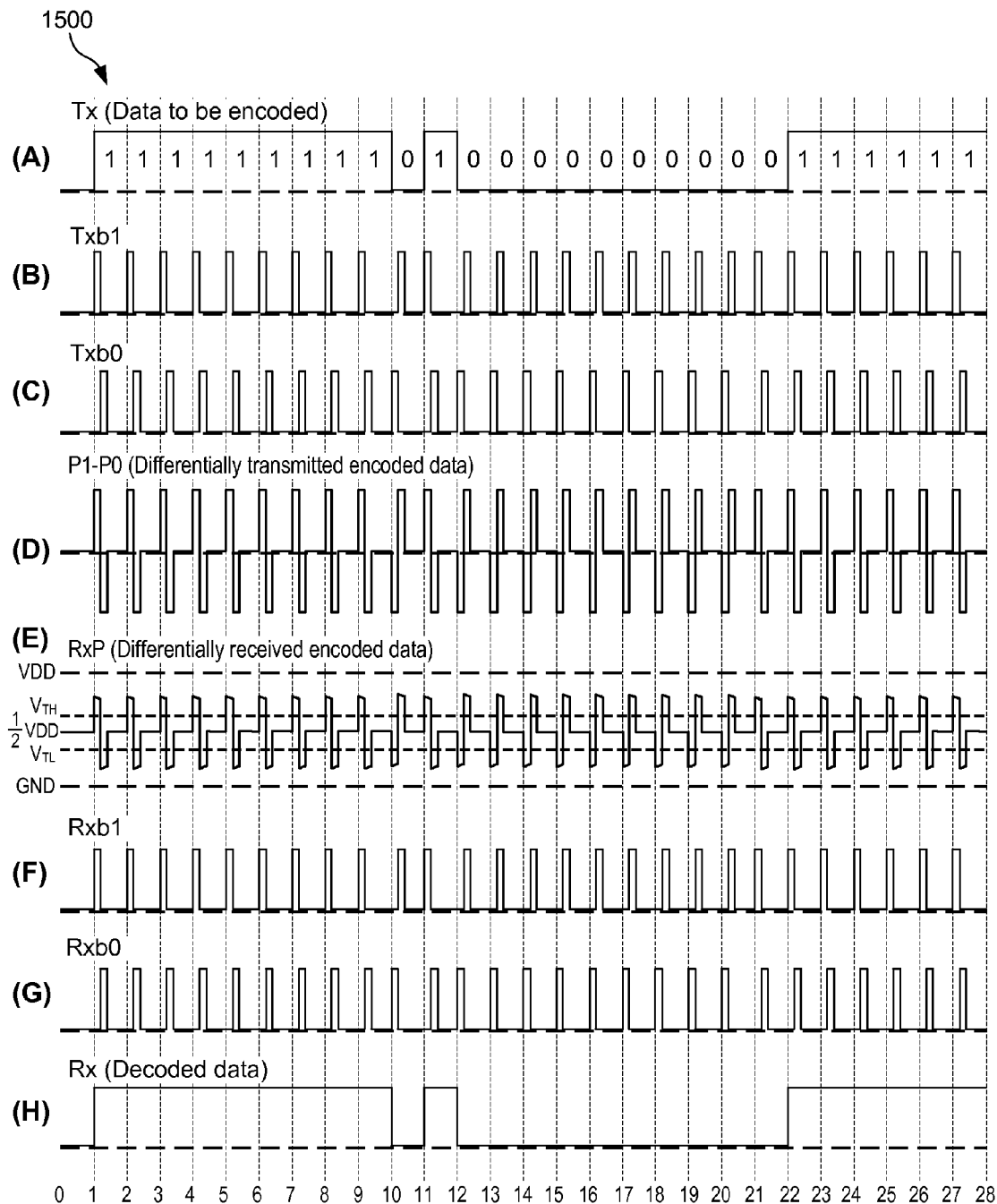
FIG. 18 shows a graphical example of DC balanced bit data encoding and decoding in accordance with the Close-Proximity Communications System Using Capacitively Coupled Signal Transfer.

Signal (a) of FIG. 18 represents a Tx signal to be encoded by encoder 1010. Signals (b), (c), and (d) represent the method, as shown and described with respect to FIG. 17, to encode each zero and one bit of the Tx signal shown in signal (a), and the encoded data to be differentially transmitted across electrodes E0 1030 and E1 1040. Signal (e) represents RxP, which is the attenuated version of the received transmitted signal shown in signal (d), amplified if necessary, and injected with a DC value of half the supply voltage, represented by VDD/2. The encoded bits ride around this known DC value. When a pulse rises above the upper threshold of $V_{TH}$ a high pulse is generated on signal Rxb1 and when a pulse drops below the lower threshold of $V_{TL}$ a high pulse is generated on Rxb0. The pulse order of Rxb0 and Rxb1 correlate exactly with the pulse order of Txb0 and Txb1. Decoder 1070 may then correctly reconstruct the original message based on this order, as shown in signals (f), (g), and (h) of FIG. 18, where Tx equals Rx.

The bit encoding discussed above possesses two important characteristics, 1) the pulse widths of the encoded bits are kept relatively short so that the per-bit decay is insignificant and 2) the average DC value of the encoded train of bits does not vary over time, which is not subject to long term signal decay. Therefore all the factors shown in FIG. 14 still apply, but this form of bit encoding is ideally suited to fit within that fundamental framework and constraints.

Clock recovery is not necessary for proper data reception since every bit is encoded. Therefore, a complete message is received without the need for a clock. It is entirely possible to send data one bit at a time where the time between bits varies, but still receive the entire message correctly. Since timing accuracy is not required, system complexity and cost are reduced.

Figure 19:
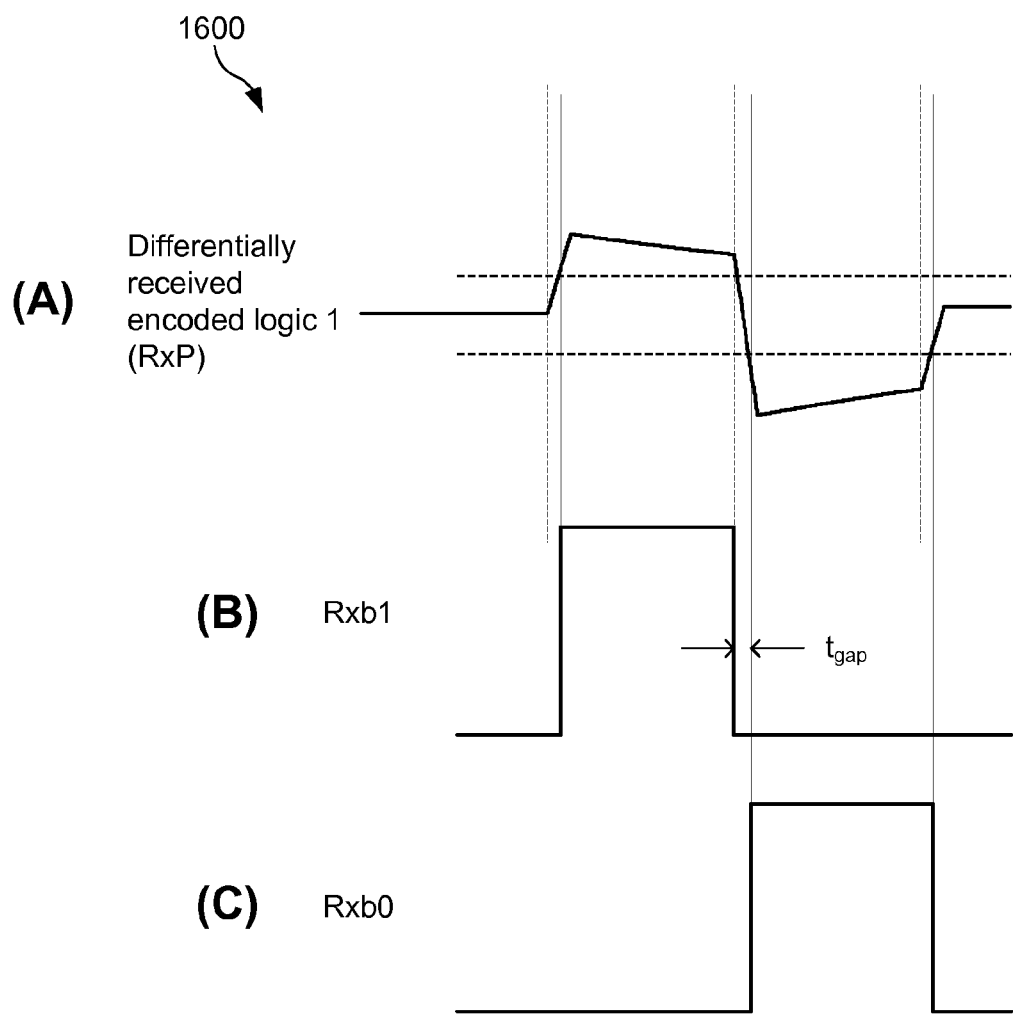
FIG. 19 shows a graphical depiction of a received encoded logic "one" bit signal in accordance with the Close-Proximity Communications System Using Capacitively Coupled Signal Transfer.

There are several ways decoder 1070 can reconstruct the original message. A closer look at a received encoded logic "one" bit signal (signal a), with Rxb0/Rxb1 pulses (signals b and c), is shown in FIG. 19. The encoded logic 1 bit signal serves as the input into the threshold detector on the RxP line. The Rxb0/Rxb1 pulses represent the threshold detector output. Since amplifiers A3 1052 and A4 1054 are used to generate the differential signal of P0 and P1, the signals are subject to the amplifier's slew rate. This is illustrated by the rising and falling ramps on the encoded logic 1 signal. As comparators C1 1062 and C2 1064 are usually much faster than the amplifiers, there is an amount of time where both Rxb0 and Rxb1 are low as the encoded pulse transitions from above $V_{TH}$ to below $V_{TL}$. This does not present an issue however, as decoder 1070 can use different methods that employ different aspects of the received Rxb0 and Rxb1 pulses to decode the original message. Decoder 1070 can use many of the known characteristic of the Rxb0 and Rxb1 pulses to determine the validity of the pulses and arrive at the intended logic level of the original transmitted signal.

One decoding method that may be used is to determine which line pulsed first. That is, if Rxb0 pulses first, then a logic 0 is received, and if Rxb1 pulses first, then a logic 1 is received. Another method is to look for both pulses. For example, if Rxb0 pulses first, followed by Rxb1, than a valid logic 0 has been received. Timing can also be used to decode the original message. For example, if Rxb0 pulses first and if within a given window of time Rxb1 pulses then a valid logic 0 has been received. Further, in other embodiments, logic level sampling can also be used. Decoder 1070 can be configured to sample the logic level of each pulse. If a pulse is received and the logic level is high at a give point in time or over a period of time, then a valid pulse has been received and decoder 1070 will have to determine which pulse was received first and which one received second.

In some embodiments, it is possible to receive the inverted version of the transmitted signal. In other words, Rx can equal the inverse of Tx. This can happen if the wiring to the electrodes is reversed on one of the devices, or if the devices are aligned such that $E0_1$ lines up with $E1_2$, and $E1_1$ lines up with $E0_2$. If this is a concern, the original binary data to be transmitted can first be differentially encoded and then fed into the Tx port so that no matter what Rx is, once differentially decoded, the original binary data is be retrieved. One example of differential encoding and decoding that is widely available, is given below. Note that "differentially encoded/decoded" bits here do not refer to the differentially encoded signal across the electrodes E0 and E1.

$$Tx_i = Tx_{i-1} \oplus s_i \text{ differential encoding of } s_i \quad \text{Eq. (8)}$$

$$s_i = Rx_i \oplus Rx_{i-1} \text{ differential decoding of } s_i \quad \text{Eq. (9)}$$

Here, $s_i$ represents the binary information that is to be communicated between both devices. $Tx_i$, which depends on the previous bit $Tx_{i-1}$, represents the differentially encoded version of $s_i$ and is fed into the Tx port of transceiver 1000. At the receiver, the received signal $Rx_i$ may or may not be the inverted version of $Tx_i$. No matter the case, differentially decoding $Rx_i$ will retrieve the original signal which depends on the current bit $Rx_i$ and the previous bit $Rx_{i-1}$.

Figure 20:
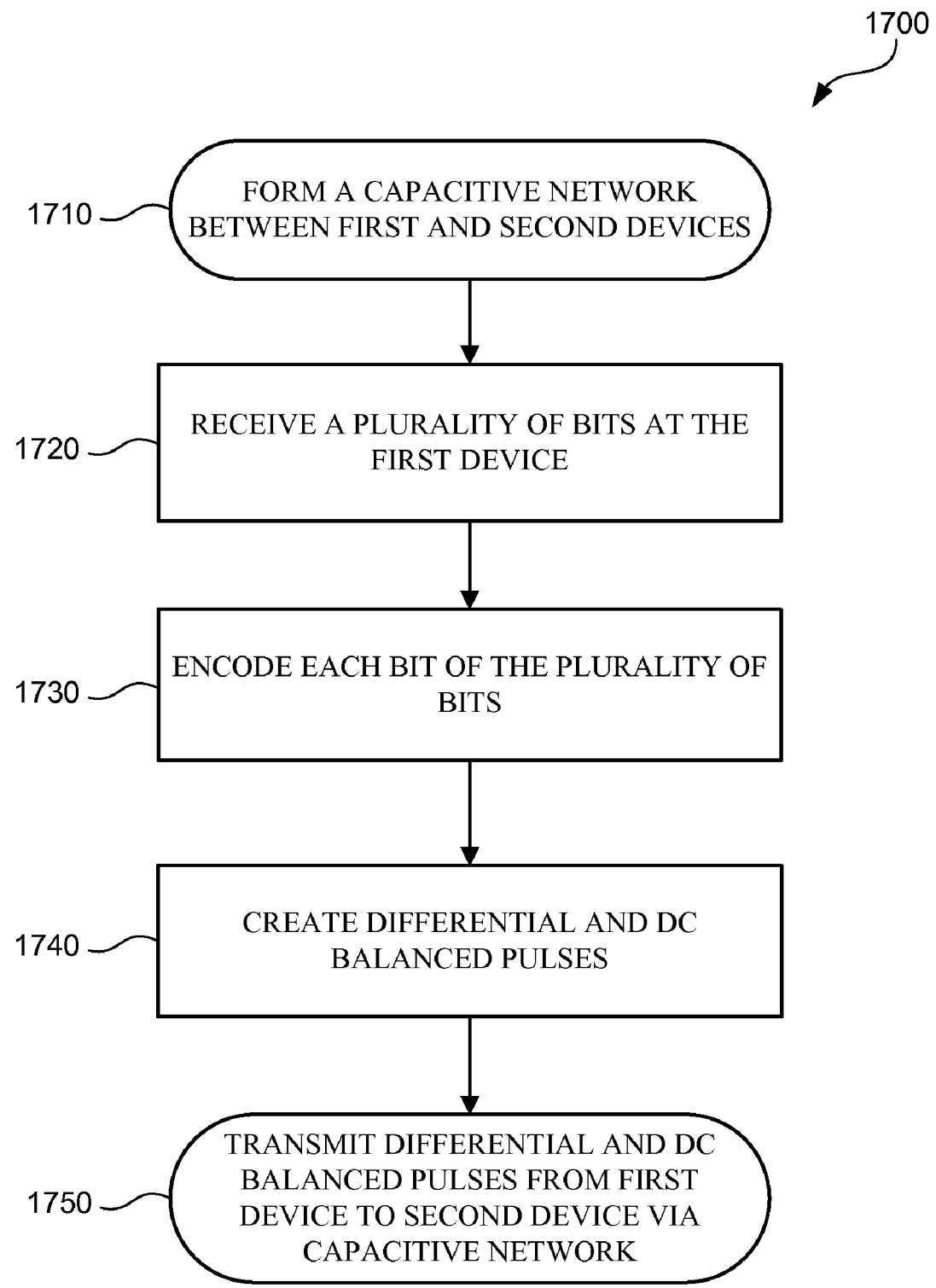
FIG. 20 shows a flowchart of an embodiment of a bit encoding and transmission method in accordance with the Close-Proximity Communications System Using Capacitively Coupled Signal Transfer.

FIG. 20 shows a flowchart of an embodiment of a bit encoding and transmission method 1700 in accordance with the Close-Proximity Communications System Using Capacitively Coupled Signal Transfer. For illustration purposes, method 1700 will be discussed with reference to systems shown in FIGS. 2, 3, and 13 discussed herein. Method 1700 may begin at step 1710, which involves forming a capacitive network 100 between a first device 210 having a first device electrode pair (electrodes 230 and 240) and a second device 250 having a second device electrode pair (electrodes 270 and 280). Such capacitive network may be formed by placing the respective electrode pairs in close proximity to each other. In some embodiments, close proximity means a distance in the millimeter range. As one non-limiting example, close proximity may be a distance of less than about 10 mm.

It should also be recognized that, in other embodiments, the distance between the first and second electrode pairs may vary depending upon factors including, but not limited to, the surface area of the electrodes, the amount of overlap between the electrode pairs, the dielectric material between the devices, and the applied voltage across the electrodes within each electrode pair. As such, the term "close proximity" may be used to refer to different distances depending upon the particular configuration of the devices.

Method 1700 may then continue to step 1720, which involves receiving a plurality of bits (shown as signal Tx) at first device 210. Step 1730 may then involve encoding, using encoder 1010, each bit of the plurality of bits to create two complimentary encoded bit pulses (Txb0 and Txb1) from the plurality of bits. In some embodiments, each of the encoded plurality of bits has the same average DC value.

Next, method 1700 may proceed to step 1740. Step 1740 involves using one or more amplifiers 1022 and 1024 to create two differential and DC balanced pulses (TxP0- and TxP1) from the two complimentary encoded bit pulses (Txb0 and Txb1). Step 1750 may then involve transmitting the two differential and DC balanced pulses to the second device electrode pair (electrodes 270 and 280) via capacitive network 100. Such transmission may occur by activating a transmit switch 1026, which may be activated by the TE line from encoder 1010 (see FIG. 13).

If, at step 1720, a "zero" bit is received by first device 210, step 1730 may comprise the following steps: generating a high pulse on a first transmit line, subsequently generating a high pulse on a second transmit line, and generating an encoded bit pulse by subtracting the pulse values on the first transmit line from the pulse values on the second transmit line. If, at step 1720, a "one" bit is received by first device 210, step 1730 may comprise the following steps: generating a high pulse on a second transmit line, subsequently generating a high pulse on a first transmit line, and generating an encoded bit pulse by subtracting the pulse values on the first transmit line from the pulse values on the second transmit line.

Figure 21:
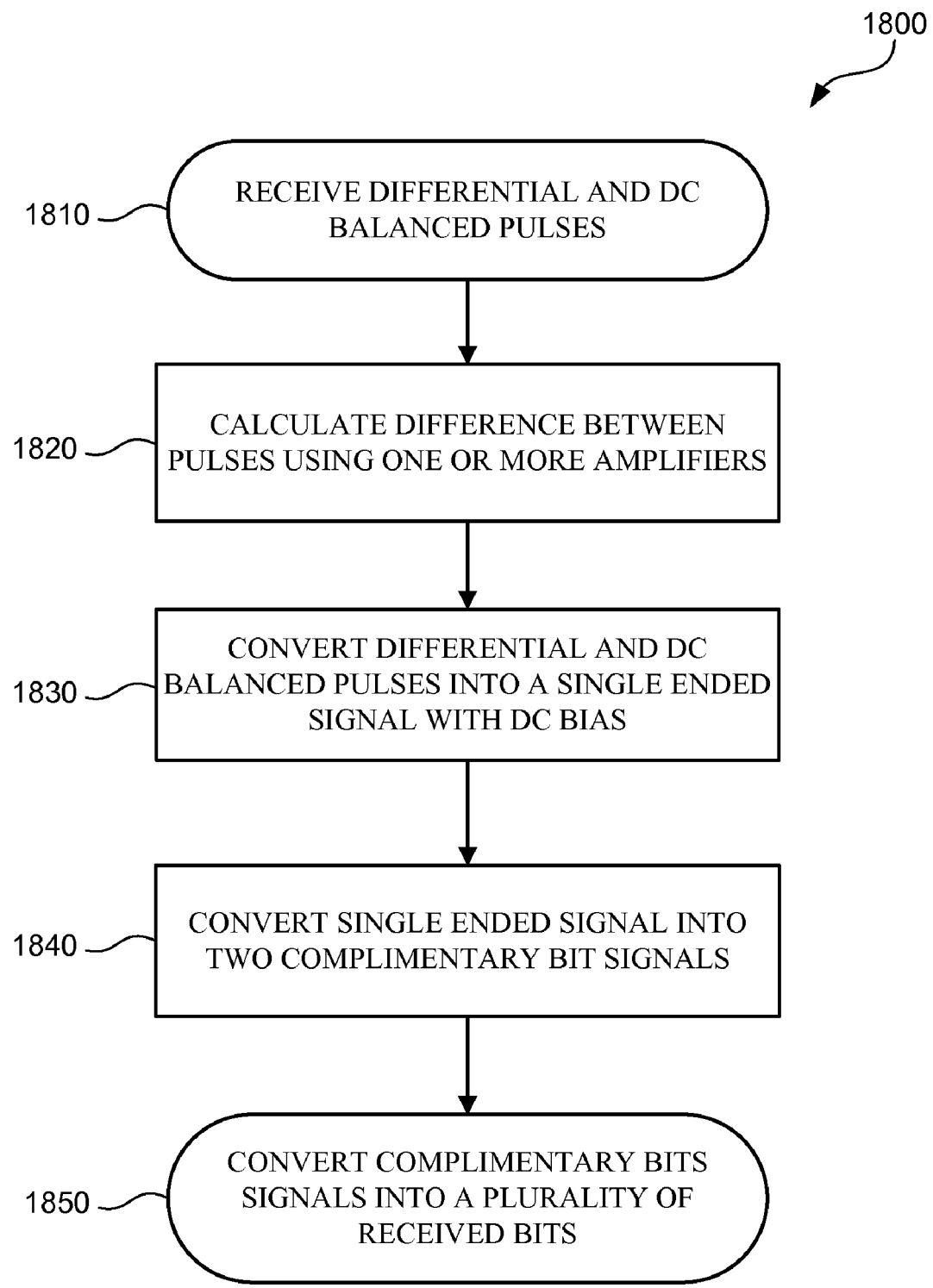
FIG. 21 shows a flowchart of an embodiment of a pulse reception and bit decoding method in accordance with the Close-Proximity Communications System Using Capacitively Coupled Signal Transfer.

FIG. 21 shows a flowchart of an embodiment of a pulse reception and bit decoding method 1800 in accordance with the Close-Proximity Communications System Using Capacitively Coupled Signal Transfer. For illustration purposes, method 1800 will be discussed with reference to systems shown in FIGS. 2, 3, and 13 discussed herein. Method 1800 may begin at step 1810, which involves receiving, via a capacitive network 100 formed between a first device 210 having a first device electrode pair (electrodes 230 and 240) and a second device 250 having a second device electrode pair (electrodes 270 and 280), two differential and DC balanced pulses at the second device electrode pair (electrodes 270 and 280).

Step 1820 may then involve calculating the difference between the received differential and DC balanced pulses using one or more amplifiers 1052 and 1054. Method 1800 may then proceed to step 1830, which involves converting the received differential and DC balanced pulses into a single ended signal with DC bias (shown in FIG. 13 as RxP). Step 1840 may then involve converting the single ended signal with DC bias into two complimentary bit signals (Rxb0 and Rxb1). Step 1850 may then involve using a decoder 1070 to convert the two complimentary bit signals into a plurality of received bits, shown in FIG. 13 as signal Rx.

Many modifications and variations of the Close-Proximity Communications System Using Capacitively Coupled Signal Transfer are possible in light of the above description. Within the scope of the appended claims, the Close-Proximity Communications System Using Capacitively Coupled Signal Transfer may be practiced otherwise than as specifically described. Further, the scope of the claims is not limited to the implementations and embodiments disclosed herein, but extends to other implementations and embodiments as may be contemplated by those having ordinary skill in the art.

I claim:

1. A system comprising:
a first device having a first transceiver and a first device electrode pair connected to the first transceiver; and
a second device having a second transceiver and a second device electrode pair connected to the second transceiver, the second device electrode pair located relative to the first device electrode pair such that the first device electrode pair and the second device electrode pair form a capacitive network
wherein the first transceiver and the second transceiver each comprise an encoder, a pulse transmitter, comprising a first amplifier and a second amplifier, connected to the encoder and the respective electrode pair, a pulse receiver connected to the respective electrode pair, a threshold detector connected to the pulse receiver, and a decoder connected to the threshold detector, wherein the first transceiver and second transceiver are each configured to receive a plurality of bits, encode each bit of the plurality of bits, and DC balance and transmit each of the plurality of encoded bits over the capacitive network.

2. The system of claim 1, wherein the first transceiver and the second transceiver communicate in half-duplex mode.

3. The system of claim 1, wherein the first transceiver and the second transceiver each further comprise an input port, an output port, and two bi-directional differential ports.

4. The system of claim 1, wherein the second device electrode pair is located less than about 10 mm from the first device electrode pair.

5. The system of claim 1, wherein the first electrode pair and the second electrode pair are formed on printed circuit boards.

6. The system of claim 1, wherein the pulse transmitter further comprises a transmit switch connected to the encoder, the first and second amplifiers, and the respective electrode pair.

7. The system of claim 1, wherein the threshold detector includes a hysterisis setting.

8. The system of claim 1, wherein the first device is configured to be inserted into the second device.

9. The system of claim 1, wherein the first device is configured to be rotatable with respect to the second device.

10. The system of claim 1, wherein the first electrode pair is located at an end of the first device and the second electrode pair is located at an end of the second device.

11. The system of claim 10, wherein the electrodes of the first electrode pair and the second electrode pair comprise concentric rings having breaks therein.

12. The system of claim 1, wherein the first device electrode pair and the second device electrode pair each include a first electrode and a second electrode, wherein the second device electrode pair is located relative to the first device electrode pair such that the respective first and second electrodes are aligned.

13. A method comprising the steps of:
forming a capacitive network between a first device having a first device electrode pair and a second device having a second device electrode pair;
receiving a plurality of bits at the first device;
encoding each bit of the plurality of bits to create two complimentary encoded bit pulses from the plurality of bits;

using one or more amplifiers to create two differential and DC balanced pulses from the two complimentary encoded bit pulses; and activating a transmit switch to transmit the two differential and DC balanced pulses to the second device electrode pair via the capacitive network.

14. The method of claim 13, wherein if a "zero" bit is received by the first device, the step of encoding each bit of the plurality of bits comprises the steps of:

generating a high pulse on a first transmit line;

subsequently generating a high pulse on a second transmit line; and generating an encoded bit pulse by subtracting the pulse values on the first transmit line from the pulse values on the second transmit line.

15. The method of claim 14, wherein if a "one" bit is received by the first device, the step of encoding each bit of the plurality of bits comprises the steps of:

generating a high pulse on a second transmit line;

subsequently generating a high pulse on a first transmit line; and generating an encoded bit pulse by subtracting the pulse values on the first transmit line from the pulse values on the second transmit line.

16. The method of claim 13, wherein the transmit switch is activated by an encoder.

17. The method of claim 13, wherein each of the encoded plurality of bits has the same average DC value.

18. A method comprising the steps of:

receiving, via a capacitive network formed between a first device having a first device electrode pair and a second device having a second device electrode pair, two differential and DC balanced pulses at the second device electrode pair;

calculating the difference between the received differential and DC balanced pulses using one or more amplifiers;

converting the received differential and DC balanced pulses into a single ended signal with DC bias;

converting the single ended signal with DC bias into two complimentary bit signals; and using a decoder to convert the two complimentary bit signals into a plurality of received bits.

* * * * *